United States Patent [19]

Potucek et al.

[11] Patent Number: 4,755,091
[45] Date of Patent: Jul. 5, 1988

[54] STAR FASTENER

[75] Inventors: Frank R. Potucek, Clearwater; Arthur G. Yeager, Jacksonville, both of Fla.

[73] Assignee: Star Fasteners International, Inc., Savannah, Ga.

[21] Appl. No.: 1,693

[22] Filed: Jan. 9, 1987

Related U.S. Application Data

[63] Continuation of Ser. No. 721,757, Apr. 10, 1985, abandoned.

[51] Int. Cl.$^4$ ............................................. F16B 15/08
[52] U.S. Cl. .................................. 411/452; 411/456; 411/489; 411/920
[58] Field of Search .................. 411/451–456, 411/457, 488, 489, 490, 922, 920

[56] References Cited

U.S. PATENT DOCUMENTS

| | | | |
|---|---|---|---|
| 18,294 | 9/1857 | Newton | 411/452 |
| 54,253 | 5/1866 | Boardman | 411/452 |
| 340,692 | 4/1886 | Bailey | 411/452 |
| 895,080 | 8/1908 | Eisenreich | 411/452 |
| 902,935 | 11/1908 | Bricker | 411/451 |
| 1,001,612 | 8/1911 | Bricker | 411/451 |
| 1,103,542 | 7/1914 | Russell | 411/451 |
| 1,134,160 | 4/1915 | Russell | 411/451 |
| 1,649,049 | 11/1927 | Williams | 411/454 |
| 2,269,708 | 1/1942 | Dickson | 411/453 |
| 3,764,278 | 10/1973 | Ivanier | 411/453 |
| 3,969,975 | 7/1976 | Krol | 411/457 |

FOREIGN PATENT DOCUMENTS

| | | | |
|---|---|---|---|
| 471134 | 2/1929 | Fed. Rep. of Germany | 411/451 |
| 1048465 | 8/1950 | France | 411/452 |
| 468601 | 1/1952 | Italy | 411/452 |
| 127167 | 1/1950 | Sweden | 411/452 |
| 1342 | of 1856 | United Kingdom | 411/454 |
| 14 | of 1859 | United Kingdom | 411/454 |
| 1504 | of 1896 | United Kingdom | 411/452 |

Primary Examiner—Neill R. Wilson
Attorney, Agent, or Firm—Joseph C. Mason, Jr.

[57] ABSTRACT

A star shaped fastener having at least five spaced vertical cups and edges about a central core with the included angle being 90° reducing the fabricated material by 50% and increasing the surface area by 15% compared to a common round nail of equal radius. The holding power is significantly enhanced by compression laterally and vertically into cups, shoulders therein and/or a taper of less than 14°.

24 Claims, 2 Drawing Sheets

STAR FASTENER

This is a continuation of co-pending application Ser. No. 721,757 filed on Apr. 10, 1985 now abandoned.

BACKGROUND OF THE INVENTION

This invention relates to fastener improvements and particularly to fasteners useable as strip or coil fasteners for powered hammering tools. The fastener in accord with this invention is an improvement over copending U.S. application Ser. No. 721,756, filed 4/10/85, filed on even date herewith.

DESCRIPTION OF THE PRIOR ART

There are many nails in use including the common and finishing smooth shank nails, the ring shank nail for increased holding power beyond that of a common round nail, the deformed shank nail including the twisted square, rectangular, spiral or screw type grooved shank nail, triangular shaped nails and the hardened masonry nails. The above-mentioned nails are designed for various purposes but none accomplish a substantial reduction in fastener material while substantially inhibiting racking between a pair of wooden members connected by the fastener in accord with this invention. Also, the holding power of the nails of the prior art are not as effective as is often needed and none measure up to the holding power of the fastener in accord with this invention. Many of the nails of the prior art are furthermore wasteful as being fabricated from an excess of steel, aluminum or other metals which is of increasingly important competitive consideration.

The prior art nails are unsuitable in many wood constructions and when used often cause splitting of the wood along the grain. For example, a common round or square or rectangular nail when driven into wood tends to drive the grain apart or to split same creating a "fisheye" condition of the grain around the nail shank. Thus, frictional contact between the common nail and the wood is less than complete and there is no tight fit about the shank thus reducing the holding power of the driven nail into the wood.

The fastener in accord with this invention overcomes many of the aforementioned problems of one or more of the prior art nails mentioned above and substantially alleviates all of the aforementioned shortcomings of the prior art as will be readily understood by consideration of the entire specification, drawings and claims herein.

SUMMARY OF THE INVENTION

The improved fastener in accord with several aspects of the invention are seen to include an elongated shank having opposite end portions and at least one longitudinal axis extending between the end portions, and an elongated central core with at least ten spaced elongated side walls forming with the core a cross-sectional shape of at least a five-pointed star. Each adjacent pair of side walls taper toward each other and form a channel, and one side wall of each pair of adjacent channels form a vertically extending V-shaped cup having its valley juxtaposed to the core. The channels include elongated edges extending substantially parallel to the longitudinal axis and terminate outwardly generally equally from the longitudinal axis. The edges are rounded to inhibit breakage thereof during driving of the fastener into material. The sides forming the cups receive therein compressible material into which the fastener is drivingly disposed to compress material in the cups between the sides to enhance the holding power of the fastener in material. The material is compressed downwardly and laterally into the cups to increase the holding power of the fastener in material. The sides of the cups are substantially planar with the sides of adjacent channels being generally perpendicular. A valley having a curved surface integral with the core is formed between the adjacent side walls of adjacent pair of channels with the angle therebetween being substantially perpendicular. The edges of the channels have a radial dimension from the core at least equal to the diameter of the core.

In other aspects, the fastener includes another shank having another longitudinal axis substantially parallel to the longitudinal axis and a bridging portion therebetween forming a head therefor to be driven as a staple. Preferably, the shank has a cross-sectional shape of at least a five-pointed star. The fastener may have one end portion tapered at an angle less than fourteen degrees (14°) to enhance the holding power of the fastener in material. A head is often provided on the other end portion for driving same with a hammer or the like into material and often a point is provided on the other one end portion. The shank is contemplated to be substantially uniformly tapered from the smaller dimension at one end portion to the other end portion at an angle less than 14° to enhance the holding power of the fastener in material such as a roofing nail or a concrete nail.

In yet other aspects the fastener includes shoulder means in the cups spaced along the shank to further enhance the holding power thereof. When the fastener includes a tapered portion the shoulder means in the cups may be spaced along only the tapered portion of the shank or the entire shank. The shoulder means are provided in at least three of the cups but may be provided in all of the vertical cups. The shoulder means extend inwardly into the core and the side walls generally medially thereof, about one-fourth of the distance from the core or entirely through and tapered to the edges of the channels. The shoulder means may extend or protrude outwardly away from the longitudinal axis or be depressions extending inwardly toward the longitudinal axis. The shoulder means preferably are located at the core and the facing side walls and merge flush with the core and the facing side walls of the channels. In yet other aspects the shank may include six, seven or more channels and the respective cross-sectional shape being a commensurate pointed star.

The fastener shank and channels therefrom in accord with the invention provide an increased outer surface area than a common round nail of a radius equal to the distance of the fastener from the longitudinal axis to one of the edges as well as ease in drivability and superior holding power than any other known hammerable fastener. Each cup extends throughout substantially the length of the shank and forming an elongated cupping means into which fibers of a pair of wooden members will be compressed downwardly and laterally during driving of the fastener into a pair of wooden members thereby substantially inhibiting racking between the pair of wooden members into which the fastener connects and enhances the holding power thereof.

The improved fastener end portions and at least one longitudinal axis extending between includes at least five equally spaced narrow prisms extending radially outwardly from the core of a predetermined cross-section and extend substantially parallel to the longitudinal axis of the core. The prisms include elongated edges extending in the same direction as the longitudinal axis with each adjacent pair of prisms forming a vertically extending V-shaped cup having its valley juxtaposed to the core. The side walls compress compressible material downwardly and laterally into the V-shaped cups to increase the holding power of the fastener in material beyond that of prior art fasteners while substantially reducing the amount of material forming the fastener.

BRIEF DESCRIPTION OF THE DRAWINGS

The novel features which are believed to be characteristic of this invention are set forth with particularity in the appended claims. The invention itself, however, both to its organization and method of operation, together with further objects and advantages thereof, may best be understood by reference to the following description taken in connection with the accompanying drawings, in which:

DETAILED DESCRIPTION OF THE PREFERRED EMBODIMENTS

Figure 1:
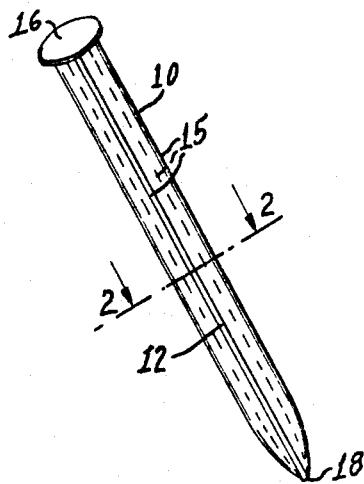
FIG. 1 is a isometric view of the fastener in the form of a nail in accord with the invention.
Figure 2:
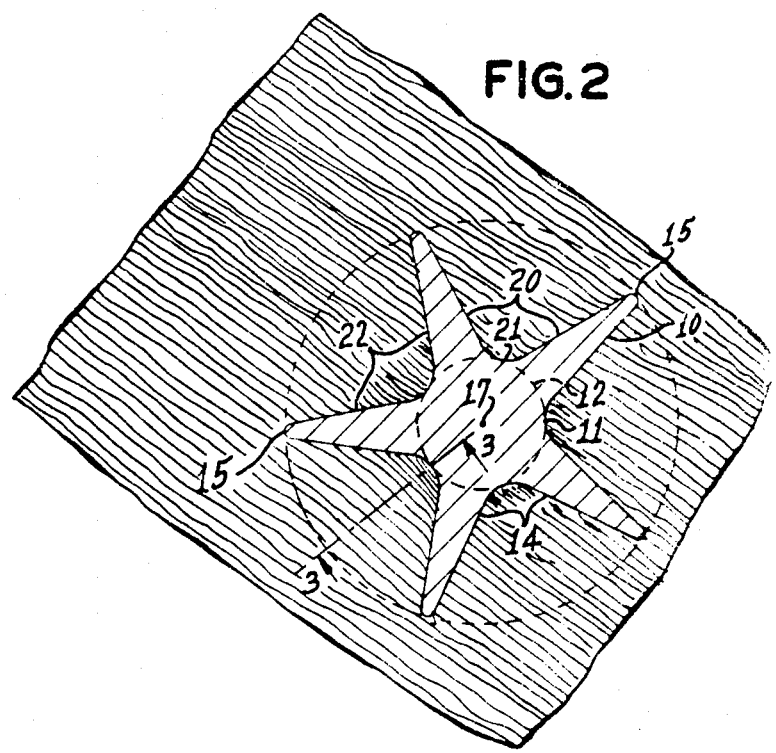
FIG. 2 is an enlarged cross-sectional view taken along line 2—2 of FIG. 1 and showing the fastener driven into the wood.
Figure 3:
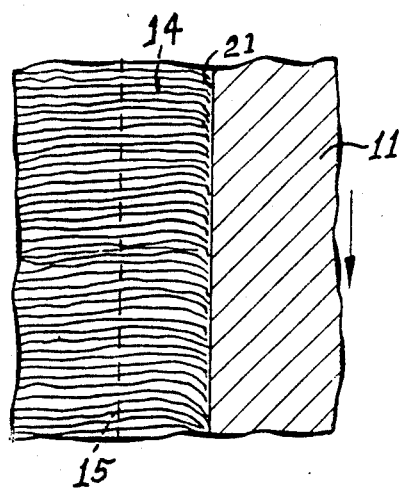
FIG. 3 is an enlarged partial vertical sectional view of the fastener taken along line 3—3 of FIG. 2 and showing the sheared wood fibers in a compressed state in a fastener vertical cup.

In FIGS. 1-3 the improved fastener 10 in accord with this invention includes an elongated shank 11 having a central cylindrical core 12 and at least five spaced tapering prisms or channels 14 extend radially outwardly therefrom and terminate in smooth and rounded outer edges 15 forming a five-pointed star in cross-section for the shank 11. At the upper end of shank 11 is a rounded head 16 which normally would extend outwardly at least to cover all of the edges 15, i.e., the radius of 16 would at least be the distance between longitudinal axis, indicated by point and numbered 17 in FIG. 2, and the edges 15. However, it is to be understood that the head 16 may be in the form of a finishing nail head or for that matter no nail head at all without departing from this invention. At the opposite end of shank 11 is preferably a point 18 as is normally provided on nails, particularly nails to be used in wood materials.

When a common nail (round, square or rectangular) is driven into wood, the nail tends often to drive the grain apart or to split same to create a "fish-eye" condition about the common nail shank. If the "fish-eye" is created, frictional contact between the wood and nail diminishes and materially effects the holding power of the driven nail into the wood. Rather than merely driving a common nail into the wood material, in accord with this invention, the nail 10, as seen in FIGS. 2 and 3 causes the fibers to be compressed laterally into the cup 20 (FIG. 2) formed between adjacent channels 14, as well as downwardly as illustrated in FIG. 3 to provide a dual wedging action and substantially increased holding power while not having any of the two edges 15 to be aligned with the grain which would often be the case with a prior art rectangular nail, for example, which often increases the probability of creating a "fish-eye" or uneven holding power on various sides of such prior art nail.

It is seen in FIG. 2 that between each pair of adjacent channels 14, facing side walls 22 form a vertical extending valley or cup 20 which has a base 21 defined by a smooth curved and merging surface from the core 12 to the edges 15 of the adjacent channels 14. With at least five such vertical cups 20 it is very probable that at least one vertical cup 20 having side walls 22 will be substantially completely in alignment with the wood grain and accordingly will have greater cam locking action or wedging action and holding power than the other partially aligned vertical cups 20.

In practice the edges 15 should be smoothly rounded to inhibit breakage during driving thereof into material. As seen in FIG. 2, the cups 20 have the contour of a right angle. Therefore, the surface area of the nail of this invention includes about fifteen percent (15%) increase in surface area as a common round nail of a radius equal to the distance of the improved nail from the longitudinal axis 17 to the edge 15 of the channel 14 and also enhancing the resistive holding power. Thus, it is seen that the surface area contact compared between the improved fastener 10 and the common round nail has to be no less than equal in resistive holding power, but is markedly increased by approximately sixty percent (60%) because of the dual wedging action in the vertical cups 20 and 21 with the compression of the fibers both laterally and downwardly. Also, the five sided star fastener 10 with substantially 90° cups 20 create a central or core cross-sectional area 12 for frictional forces of the severed and compressed wood grain which also forces the grain to bend downwardly for cam locking action between the material and the fastener 10, unlike a prior art cross shaped or plus shaped (+) nail.

Figure 4:
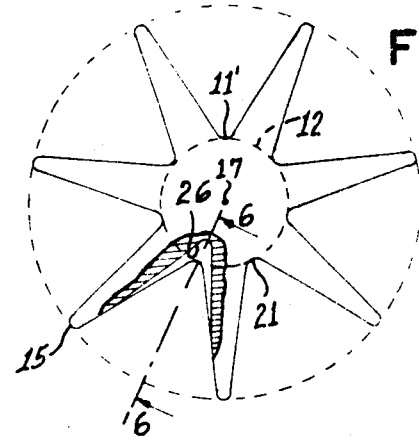
FIG. 4 is an enlarged cross-sectional view similar to FIG. 2 and depicting a second embodiment of the invention.
Figure 6:
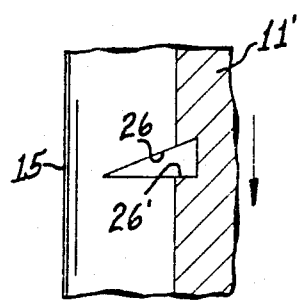
FIG. 6 is a cross-sectional view taken along line 6—6 of FIG. 5.
Figure 5:
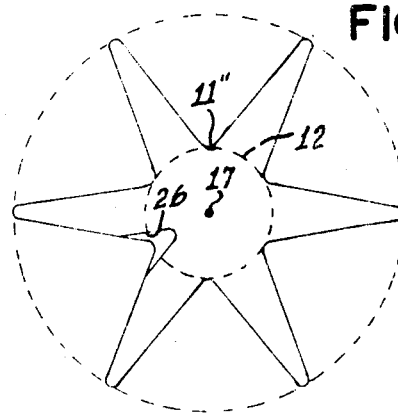
FIG. 5 is an enlarged cross-sectional view similar to FIG. 2 and depicting a third embodiment of the invention and showing locking serrations in the cups.

The fastener in accord with another embodiment of the invention is depicted in FIG. 4 and comprises a seven-pointed shank 11' or a six-pointed shank 11" is shown in FIG. 5. As seen in FIGS. 5 and 6, shoulder means in the form of depressions 26 somewhat similar to the concepts of the ring shank nail can be made in the shank 11 of the fastener 10 to take advantage thereof and even further enhance the holding power of the fastener 10 in accord with this invention. These shoulder means 26 provide a shoulder 26' against which the wood fibers engage to inhibit removal of the fastener 10 and the depressions may span the base 21 of the cup 20 from about a quarter of the length of the channels 14, as shown in FIGS. 5 and 6, to about one-half the length thereof, as shown in FIG. 4, and preferably extend inwardly into the central core 12. While a ring shank nail has some increased holding power it is readily apparent that when the shank of the greatest diameter enters the wood and each rib thereafter follows, the ring shank causes an effect similar to a rasp in an opening and creates uneven holding power throughout the length of the shank. The improved nail herein provides less rasping effect and more uniform holding power throughout its length.

Of course, with the cups 20 and tips 15, the improved fastener 10 inhibits rotative relative movement between the fastener and the wood it is driven into as well as racking as between a pair of wood materials joined by the improved fastener which are not features of a ring shank nail. Another important feature of the improved fasteners according to the invention is provided by the use of a substantial reduction of fifty percent (50%) of the steel or the like to fabricate the shank 11 than the common nail without materially reducing the beam of the nail and increasing its holding power and providing racking resistance. Furthermore, it is easier to drive in the improved fastener 10 due to its smaller cross-sectional area and such small area even provides less wood splitting and/or "fish eyes". There is also less bending of the improved fastener 10 as compared to a common round nail of equal radius as from the axis 17 and edge 15.

Figure 7:
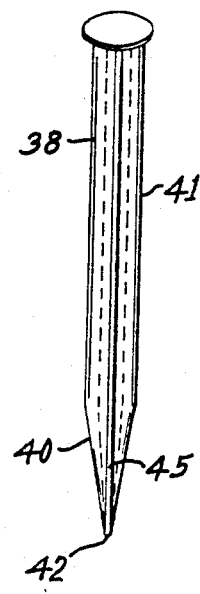
FIG. 7 an isometric view of the fastener in accord with a fourth embodiment of the invention.
Figure 8:
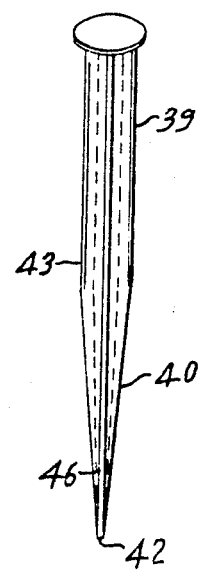
FIG. 8 is an isometric view of the fastener in accord with a fifth embodiment of the invention.
Figure 9:
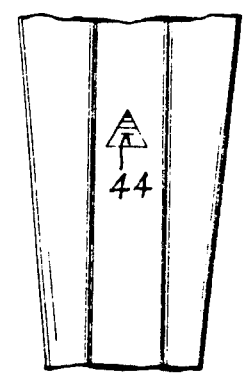
FIG. 9 is an enlarged partial plan view of the fastener of FIG. 8 showing serrations in the cups.
Figure 10:
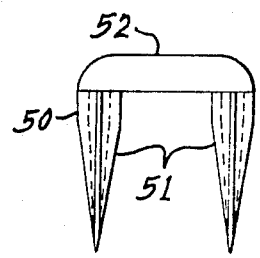
FIG. 10 is an isometric view of the fastener in form of a staple in accord with a sixth embodiment of the invention.

In FIGS. 7 and 8 the embodiments of the improved fasteners 38 and 39 are seen to include a lower end portion 40 which is tapered from the shank 41 to its extremity 42 by an angle of less than 14° so that the locking effect produced thereby further enhances the holding power of the fasteners 38 and 39. In FIG. 7 the tapered end portion 40 extends about one-fourth the length of shank 41 while the taper depicted in FIG. 8 is about one-half the length of shank 43. To even greater enhance the holding power, the shoulder means 44, substantially identical to shoulder means 26, described in connection with FIGS. 5 and 6, may be employed, as illustrated in FIG. 9, spacedly along the vertical cups 45 and 46 in tapered and portions 40 of respective shanks 41 and 43. Likewise such shoulder means 44 may extend throughout the length of the shanks 41 and 43 of respective nails 38 and 39, if found to be desirable.

Figure 11:
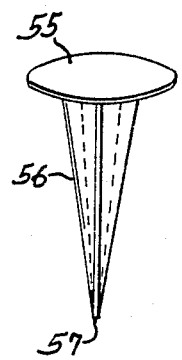
FIG. 11 is an isometric view of the fastener in the form of a roofing nail in accord with a seventh embodiment of the invention.

It is understood that the fastener in accord with this invention may be in the form of staple 50 having a pair of substantially parallel shanks 51 and a bridging head portion 52. Each shank 51 would have a cross-section of at least a five-pointed star, as previously described in connection with FIG. 1, and may include the shoulder means 26 of FIGS. 5 and 6, and/or the taper as described in FIGS. 7 and 8, hereabove specifically described, or fully tapered as illustrated in FIG. 11, hereafter described. Whether head portion 52 is round or flat or includes the elongated cups 45 and 46 or shoulder means 44 may be determined as needed without departing from the spirit or scope of the improved fastener herein described.

In FIG. 11 another embodiment of the fastener in the form of a roofing fastener 55 is depicted as having a cross-section of at least a five-pointed star and showing a substantially full tapered shank 56 with a slightly blunted end 57. Similarly, shoulder means like those illustrated at 26 in FIGS. 5 and 6 or shoulder means 44 in FIG. 9, could be employed in the fastener 55 of FIG. 11. The fastener 55 may also be hardened as by heat treatment to provide a concrete fastener. several of the fasteners described herein are suitable for use with drywall applications, paneling and the like materials as wall. Since it is intended to work or form the fasteners herein described, they will have a greater shear and tensile strength with greater bending resistance. In some applications previously requiring heat treated nails, the fasteners according to this invention may be useable in lieu of such other nails.

Figure 12:
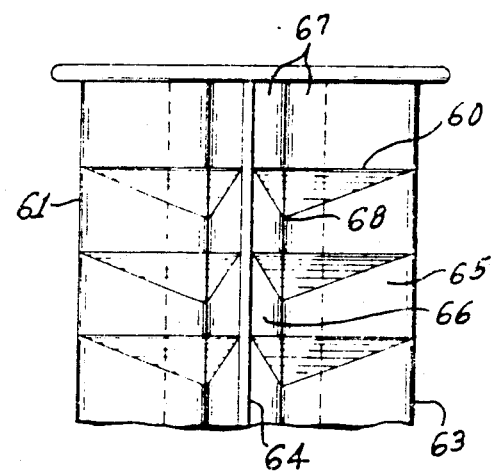
FIG. 12 is a partial side elevational view of the fastener in accord with an eighth embodiment of the invention.
Figure 13:
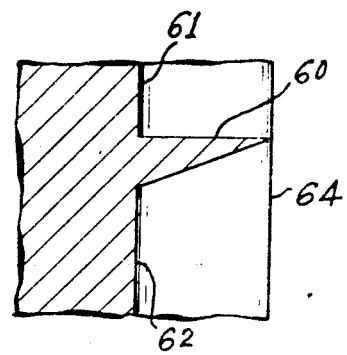
FIG. 13 is a partial cross-sectional view of the fastener taken along a plane through the shank thereof equidistant of a pair of edges.

It is contemplated that the shoulder means, previously described (26 and 44) in the form of depressions, may be protrusions or a building out form as illustrated by shoulders 60, as shown in FIGS. 12 and 13, spaced along the shank 61 from core 62 tapering radially to the edges 63 and 64 of the adjacent facing sides 65 and 66 of the cup 67 formed therebetween and tapering downwardly to merge with core 62 at valley 68. Since shoulders 60 extend outwardly more in the nature of a ring shank nail, this embodiment of the invention would tend to produce more rasping effect than the embodiment of the invention depicted and described in connection with FIGS. 4–6. However, it is to be understood that since the fastener herein is intended to be formed, the depressions 26 and 44 or protrusions 60 are quite different than the ring shank nail in which a cutting action is used to cut the rings thereinto from a common round nail so that there is a substantial weakening of the ring shank nail, i.e., pointed ring breaking or cut creating increased fracture points or lines causing shank to bend more easily or break during driving thereof and/or removal.

Also, the shoulder means, depressions 26 and 44 or protrusions 60, may be added or deleted from the shanks as determined to provide maximum holding power or withdrawal resistance according to different woods (hard, medium, soft) or into materials having a uniform or uneven grain or a material having no grain effect like drywall made of gypsum or the like. Furthermore, it is to be understood that the cup angle and radius of the core may be adjusted to increase or decrease the cross-sectional area and/or modify the resistive contact between the fastener and the material with corresponding changes in the compression and cam locking effects and with addition or selective placement of shoulder means and/or tapering ends to obtain the maximum holding power, if desired, and maximum tensile and shear. In other words, the shape and other features of the improved fastener may be adjusted to become equal to the same strength as the material in which the fastener is being used, if found desirable for particular applications.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A fastener comprising an elongated shank having opposite end portions and at least one longitudinal axis extending between said end portions, a head on one said end portion for driving same with a hammer or the like into material, said shank having an elongated central core and ten spaced elongated side walls perpendicularly extending from the bottom wall of said head and forming with said core a cross-sectional shape of a five-pointed prism star, each adjacent pair of side walls tapering toward each other and forming a vertically extending L-shaped cup having its valley juxtaposed to said core, said prisms having elongated edges extending substantially parallel to said longitudinal axis and terminating outwardly generally equally from said longitudinal axis, said edges being slightly rounded to inhibit breakage thereof during driving of said fastener into material, said sides of said cups being substantially planar and being substantially perpendicular to each other, said sides of each said cups receiving therein compressible material into which said fastener is drivingly disposed to compress material downwardly and laterally in said cups between said sides to enhance the holding power of said fastener in material, each adjacent pair of side walls defining respective said cups forming a slightly inwardly curved surface defining its valley with respect to and integrally connected with said core, said edges having a radial dimension from said core equal to or greater than the diameter of said core to maximize the surface area of said fastener and to minimize the fabricating material of said fastener without materially effecting the bending strength of said fastener.

2. The fastener as defined in claim 1 wherein said fastener includes another shank substantially identical to said shank and having another longitudinal axis substantially parallel to said longitudinal axis, and a bridging portion between said shank and said other shank forming said head therefor to be driven, said shanks and head being in the form of a U-shaped staple.

3. The fastener as defined in claim 1 further comprising shoulder means in said cups space along said shank to further enhance the holding power thereof.

4. The fastener as defined in claim 1 wherein said shank is substantially uniformly tapered from the small dimension at said other end portion to said one end portion at an angle less than fourteen degrees (14°) to enhance the holding power of the fastener in material into which it is drivable.

5. The fastener as defined in claim 4 further comprising shoulder means in said cups spaced along the tapered portion of said shank to further enhance the holding power thereof.

6. The fastener as defined in claim 1 further comprising shoulder means in three of adjacent said cups spaced along said shank in the direction of said longitudinal axis to enhance the holding power of the fastener in material into which it is drivable.

7. The fastener as defined in claim 6 wherein said shoulder means extend inwardly into said core and said side walls generally medially thereof.

8. The fastener as defined in claim 6 wherein said shoulder means extend inwardly into said core and said side walls generally one-quarter the dimension of said side walls from said core to respective said edges.

9. The fastener as defined in claim 6 wherein said shoulder means extend outwardly away from said longitudinal axis to provide more displacement of the material into which the fastener is driven thereby enhancing the holding power thereof.

10. The fastener as defined in claim 6 wherein said shoulder means extend inwardly toward said longitudinal axis.

11. The fastener as defined in claim 6 wherein said shoulder means extend inwardly in said valleys and into said core and said side walls forming said L-shaped cup, said shoulder means terminating outwardly short of said elongated edges.

12. The fastener as defined in claim 11 wherein said shoulder means terminate no more than medially between said valleys and said elongated edges.

13. The fastener as defined in claim 6 wherein said shoulder means extends outwardly from said core and said side walls to provide more displacement of the material into which the fastener is driven thereby enhancing the holding power thereof.

14. The fastener as defined in claim 13 wherein said shoulder means tapers toward and merges flush substantially at said elongated edges of said cups.

15. The fastener as defined in claim 6 wherein said shoulder means tapers outwardly to merge with respective said side wall and tapers in the vertical direction with a centerline parallel to said longitudinal axis to merge with said core.

16. The fastener as defined in claim 15 wherein said shoulder means extend inwardly toward said longitudinal axis.

17. The fastener as defined in claim 15 wherein said shoulder means extend outwardly away from said longitudinal axis to provide more displacement of the material into which the fastener is driven thereby enhancing the holding power thereof.

18. A fastener comprising an elongated shank having a longitudinal axis and opposite end portions, a head on one said end person, a tapered point on said other end portion, said shank having an elongated central cylindrical core and five equally spaced narrow elongated channels tapering outwardly from said core toward elongated edges extending perpendicularly from the lower wall of said head and substantially throughout said shank between said end portions, said outer edges being generally equally spaced from said longitudinal axis, each adjacent pair of said channels having facing side walls forming a vertical L-shaped cupping means having a valley juxtaposed to said core, said valley being defined by a tightly curved surface adjacent said core to substantially planar said facing sides of said adjacent pair of said channels, said edges being rounded to inhibit breakage thereof during driving of said fastner into material, said facing sides of each pair of adjacent channels forming each said cupping means having an included angle of substantially 90°, each said edges having a radial dimension from said longitudinal axis greater than the diameter of said core, said cupping means capturing and directing downwardly and laterally inwardly fibers of wood material into which said fastener is to be driven whereby a dual wedging action is provided therebetween enhancing the holding power therebetween and substantially increasing the holding power thereof above the holding power of a common round nail of a radius equal to the distance of said fastener from said longitudinal axis to said edges of said channels.

19. The fastener as defined in claim 18 further comprising shoulder means in three of adjacent said cups spaced along said shank in the direction of said longitudinal axis to further enhance the holding power of said fastener in material into which it is drivable, said shoulder means extending outwardly away from said longitudinal axis to provide more displacement of the material into which said fastener is driven thereby further enhancing the holding power thereof 20. The fastener as defined in claim 18 further comprising shoulder means in three of adjacent said cups spaced along said shank in the direction of said longitudinal axis to further enhance the holding power of the fastener in material into which it is drivable, said shoulder means extending outwardly from said core and said side walls to provide more displacement of the material into which the fastener is driven thereby further enhancing the holding power thereof, said shoulder means tapering toward and merging flush substantially at said edges of said channels.

21. A fastener comprising an elongated shank having opposite and portions and at least one longitudinal axis extending between said end portions, a head on one said end portion, a tapered point of the other said end portion, said shank having an elongated central core and five equally spaced narrow prisms extending radially outwardly from said core and extending substantially parallel to said longitudinal axis throughout said shank and perpendicularly between the lower wall of said head to said other end portion, said prisms having elongated edges extending in the same directions as said longitudinal axis, each adjacent pair of said prisms forming a vertically extending V-shaped cup having its valley juxtaposed to said core said shank having a cross-sectional shape of at least a five-pointed star, said edges being rounded to inhibit breakage thereof during driving of the fastener into material, each adjacent pair of said prisms including facing side walls forming said cup into which material receiving said fastener drivingly therein is compressed both downwardly and laterally into engagement with said side walls to enhance the holding power of said fastener in material, said sides of adjacent said prisms being substantially perpendicular to each other, said facing side walls of each pair of adjacent said prisms converge toward each other and form a tightly curved smooth surface integral with said core.

22. The fastener as defined in claim 21 wherein three of said adjacent cups include spaced shoulder means along at last said smooth surface engageable with material compressed into said cups to further enhance the holding power of said fastener.

23. The fastener as defined in claim 22 wherein said shoulder means extend inwardly of said core and at least partially within said facing side walls.

24. The fastener as defined in claim 22 wherein said shoulder means extend outwardly of said core and at least partially outwardly of said facing side walls to provide more displacement of the material into which said fastener is driven thereby enhancing the holding power thereof.

* * * * *